United States Patent [19]

Kim

[11] Patent Number: 5,796,448
[45] Date of Patent: Aug. 18, 1998

[54] STRUCTURE FOR A PARASITIC CAPACITOR AND A STORAGE CAPACITOR IN A THIN FILM TRANSISTOR-LIQUID CRYSTAL DISPLAY AND A METHOD FOR MAKING THE SAME

[75] Inventor: Dong-Gyu Kim, Suwon, Rep. of Korea

[73] Assignee: Samsung Electronics Co., Ltd., Kyonggi-Do, Rep. of Korea

[21] Appl. No.: 593,244

[22] Filed: Jan. 29, 1996

[30] Foreign Application Priority Data

Jan. 27, 1995 [KR] Rep. of Korea .................. 95-1528

[51] Int. Cl.$^6$ .................. G02F 1/1343; G02F 1/136
[52] U.S. Cl. .................. 349/39; 349/38; 349/43
[58] Field of Search .................. 349/38, 39, 43

[56] References Cited

U.S. PATENT DOCUMENTS 5,182,661  1/1993  Ikeda et al. .................. 349/38
5,276,540  1/1994  Okamoto et al. .................. 349/39

Primary Examiner—Anita Pellman Gross
Attorney, Agent, or Firm—Cushman Darby & Cushman IP Group of Pillsbury Madison & Sutro LLP

[57] ABSTRACT

The present invention includes a drain of the TFT which operates as a first upper electrode of the parasitic capacitor. A second upper electrode of the storage capacitor overlaps with the pixel electrode. An insulating layer is disposed between the second upper electrode and the pixel electrode. An insulating layer is also disposed between a first lower electrode of the parasitic capacitor at its associated upper electrode, as well as a second lower electrode of the storage capacitor and its associated upper electrode. Further, the overlapping direction of the two upper electrodes is identical with that of the two lower electrodes so that an undesired dc-offset voltage is made proportional between each of the pixels in the TFT-LCD array.

11 Claims, 7 Drawing Sheets

STRUCTURE FOR A PARASITIC CAPACITOR AND A STORAGE CAPACITOR IN A THIN FILM TRANSISTOR-LIQUID CRYSTAL DISPLAY AND A METHOD FOR MAKING THE SAME

BACKGROUND OF THE INVENTION

1. Field of the Invention

The present invention relates to a structure for a parasitic capacitor and a storage capacitor in a thin film transistor-liquid crystal display (hereinafter referred to as a TFT-LCD) and a method for making the same. More particularly, it relates to a structure for a parasitic capacitor and a storage capacitor in a TFT-LCD and a method for making the same, for achieving display uniformity by reducing an error ratio of a dc-offset voltage $\Delta Vp$ to less than 1%.

2. Description of the Related Art

A conventional structure of a parasitic capacitor and a storage capacitor in a TFT-LCD will be described with reference to FIGS. 1–3.

As shown in FIG. 1, a conventional TFT-LCD has a gate electrode 3 which is a lower electrode of a parasitic capacitor $C_{gd}$, an insulating layer and a semiconductor layer 4 are dielectric materials of the parasitic capacitor $C_{gd}$, and a drain electrode 6 is an upper electrode of the parasitic capacitor $C_{gd}$. The overlapping portion between the gate electrode 3 and the drain electrode 6 is an important element of this parasitic capacitor. Electrons left within a channel when the thin film transistor (hereinafter referred to as a TFT) operates raises the capacitance of the parasitic capacitor.

As shown in FIGS. 1 and 2, a lower electrode 13 of a conventional storage capacitor $C_s$ is made of the same metal as that of the gate electrode 3, shown in FIG. 1. An insulating layer 22 and a passivation layer 23 are dielectric materials used in the conventional storage capacitor $C_s$. A transparent pixel electrode 28 forms the upper electrode of the conventional storage capacitor $C_s$. The overlapping portion L1 between the lower electrode 13 and the transparent pixel electrode 28 is used as a storage capacitor $C_s$.

FIG. 3 is a plan view showing pixels used for another conventional TFT-LCD in which the layout of a storage capacitor $C_s$ and a parasitic capacitor $C_{gd}$ is different from that of FIG. 1.

Conventionally, the parasitic capacitor $C_{gd}$ and storage capacitor $C_s$ have the following problems.

Since a photomask for forming a TFT array pattern is smaller than the size of a TFT-LCD screen having a wide area, the screen is divided into several shot-blocks and the shot-blocks are sequentially exposed to light. As a result, the overlapping area between the drain electrode 6 and the gate electrode 3, which operate so the parasitic capacitor $C_{gd}$, is different in every shot-block.

Different capacitances in the parasitic capacitors $C_{gd}$ of the different shot-blocks is a result of the different size overlapping areas. An error, which occurs as a dc-offset voltage $\Delta Vp$, is generated due to the differences between the parasitic capacitances $C_{gd}$ in different shot-blocks. Since a display voltage will drop by the dc-offset voltage $\Delta Vp$ when voltage is applied to a pixel, the dc-offset will cause nonuniformity of the voltages applied to the shot-blocks, thereby causing a nonuniform image.

The dc-offset voltage $\Delta Vp$ can be calculated by the following equation.

$$\Delta Vp = \frac{C_{gd}}{C_{gd} + C_{LC} + C_s} \Delta Vg,$$

where $\Delta Vg$ is the applied gate voltage
$C_{LC}$ is the liquid crystal capacitance Voltage differences (due to different offset voltages $\Delta Vg$) between pixels of more than tens of milliamperes cause differences in the light intensity between pixels of about 1%. However, differences in light intensity of more than 1% can be caught by the human eye. As a result, even small differences in the dc-offset voltages $\Delta Vp$ can cause noticeable differences in the light intensity of every pixel, thereby causing nonuniform images.

SUMMARY OF THE INVENTION

An object of the present invention is to provide a structure for a parasitic capacitor and a storage capacitor in a TFT-LCD and a method for making the same, which reduces an error ratio of a dc-offset voltage $\Delta Vp$ to less than 1% by making $C_{gd}$ proportional to $C_s$, and thus achieve display uniformity.

In order to achieve this object and others, a TFT-LCD in accordance with the present invention includes a drain of the TFT which operates as a first upper electrode of the parasitic capacitor. A second upper electrode of the storage capacitor overlaps with the pixel electrode. An insulating layer is disposed between the second upper electrode and the pixel electrode. An insulating layer is also disposed between a first lower electrode of the parasitic capacitor and its associated upper electrode, as well as a second lower electrode of the storage capacitor and its associated upper electrode. Further, the overlapping direction of the two upper electrodes is identical with that of the two lower electrodes so that an undesired dc-offset voltage is made proportional between each of the pixels in the TFT-LCD array.

A method for making the TFT-LCD in accordance with the present invention includes the steps for depositing a gate metal on a substrate; forming a gate electrode, a gate line, and a lower electrode of a storage capacitor; depositing an insulating layer; depositing an amorphous silicon layer and an N$^+$ amorphous silicon layer; patterning the amorphous silicon layer and the N$^+$ amorphous silicon layer; depositing a source/drain metal; forming a source electrode, a drain electrode overlapped with gate electrode, a data line, and an upper electrode of the storage capacitor simultaneously; etching the N$^+$ amorphous silicon layer interposed between the source electrode and the drain electrode; depositing a passivation layer; depositing a pixel electrode; and a connecting the pixel electrode with the upper electrode of the parasitic capacitor.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

The preferred embodiments of the present invention will become apparent from a study of the following detailed description, when viewed in light of the accompanying drawings.

Figure 4:
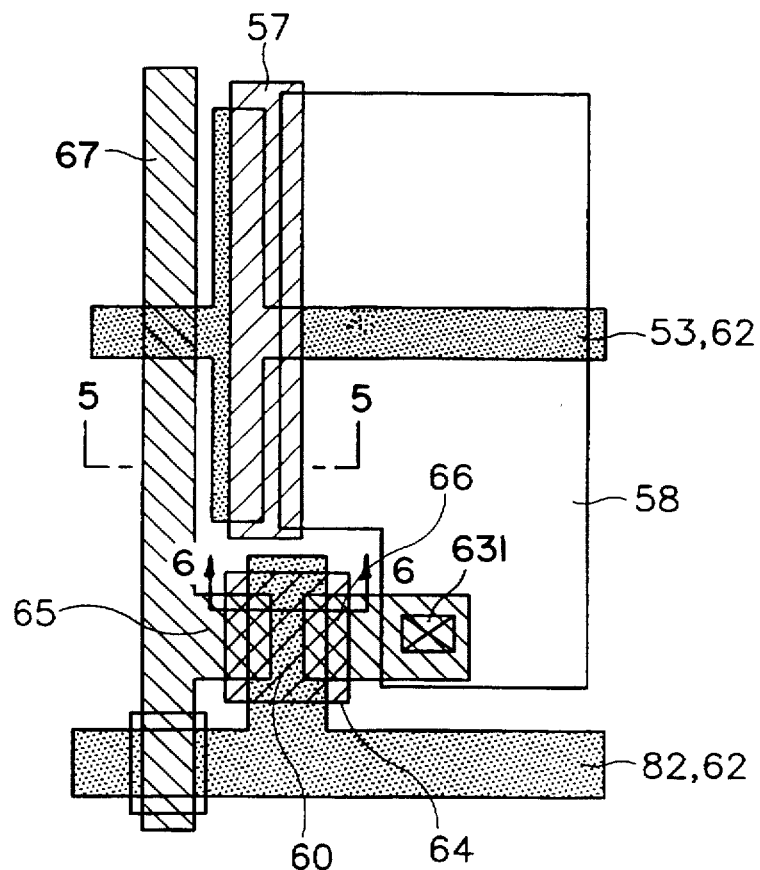
FIG. 4 is a plan view illustrating a pixel of a TFT-LCD in accordance with a preferred embodiment of the present invention.
Figure 5:
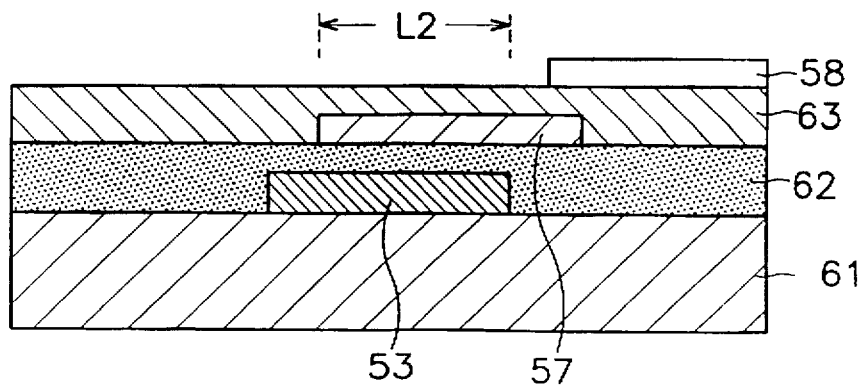
FIG. 5 is a cross-sectional view, taken along line 5—5 of FIG. 4, illustrating a storage capacitor of a TFT-LCD in accordance with a preferred embodiment of the present invention.
Figure 6:
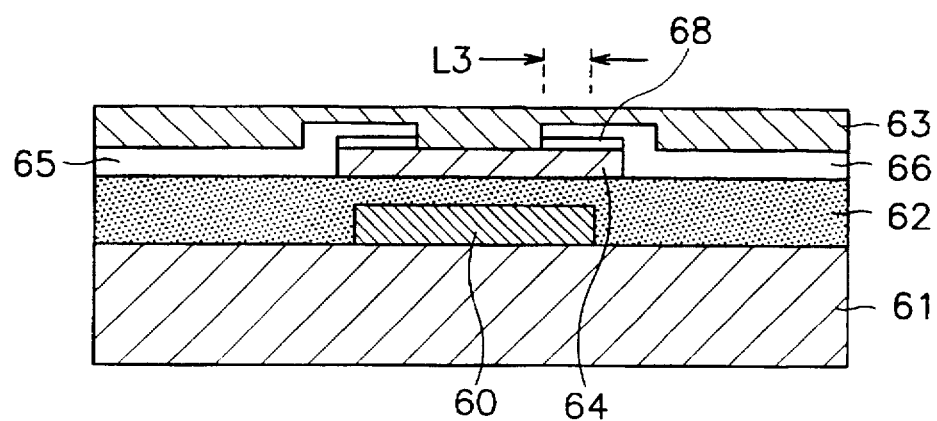
FIG. 6 is a cross-sectional view, taken along line 6—6 of FIG. 4, illustrating a parasitic capacitor of a TFT-LCD in accordance with a preferred embodiment of the present invention.

As shown in FIGS. 4 to 6, a TFT-LCD in accordance with the present embodiment includes a parasitic capacitor with an upper electrode 66, an insulating layer 62 and a lower electrode 60. A storage capacitor includes an upper electrode 57 which overlaps with a pixel electrode 58, insulating layer 62, and a lower electrode 53. The upper electrodes 57 and 66 overlap corresponding edges of the lower electrodes 53 and 60, respectively.

As shown in FIGS. 4 to 7A, a gate metal is deposited on a substrate 61. A gate electrode 60 (which is the lower electrode of a parasitic capacitor), a gate line 82, and a lower electrode 53 of a storage capacitor are formed by etching the gate metal. The lower electrode 53 can be separated from the gate line 82, or connected to the gate line 82.

Figure 7A:
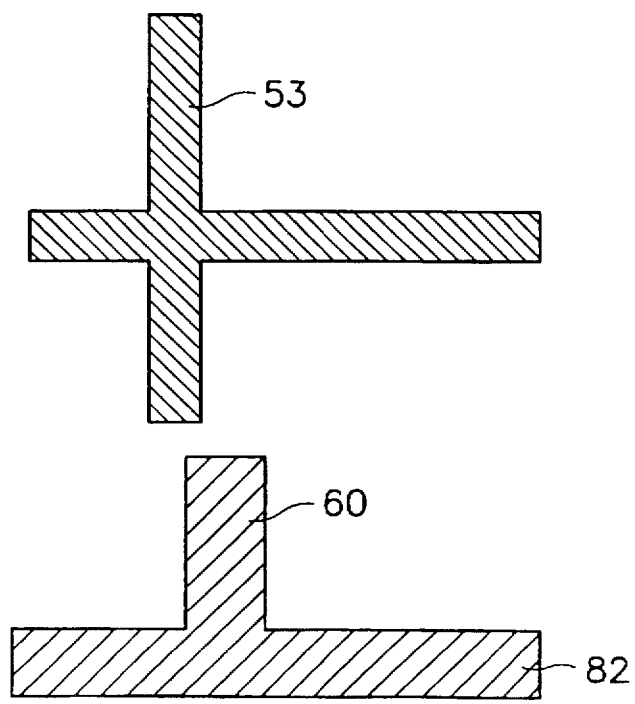
FIGS. 7A–7G sequentially show a method for making the TFT-LCD in accordance with a preferred embodiment of the present invention.
Figure 7C:
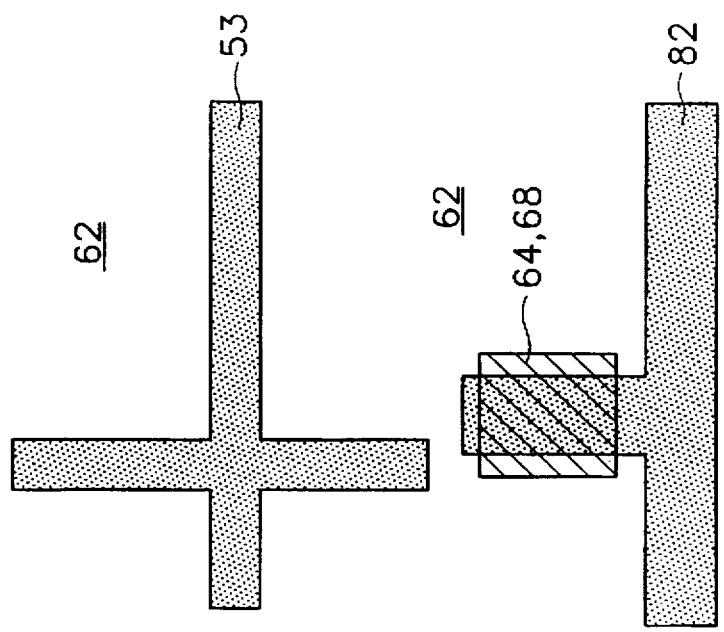
Figure 7B:
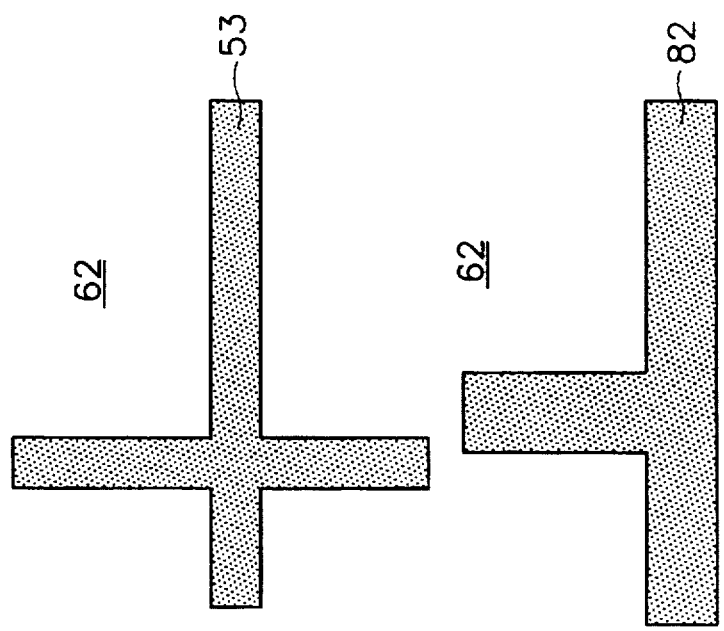

As shown in FIGS. 4 and 7B, the insulating layer 62 is deposited entirely over the gate electrode 60 and the lower electrode 53.

As shown in FIGS. 4 and 7C, an amorphous silicon layer 64 and an $N^+$ amorphous silicon layer 68 are deposited successively on the insulating layer 62, and then patterned simultaneously.

Figure 7D:
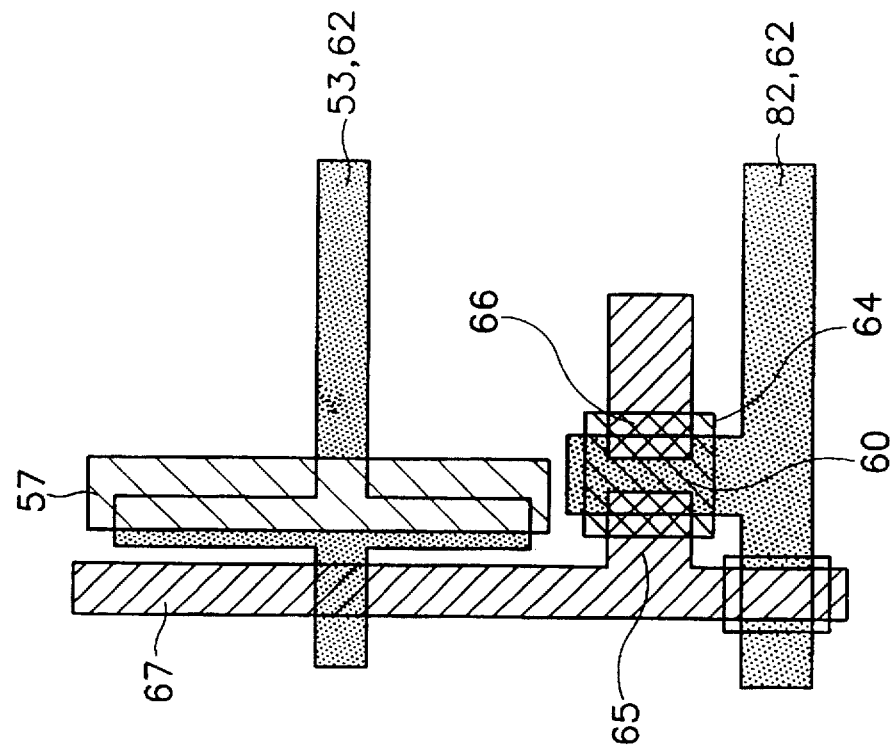

As shown in FIG. 4 and 7D, a source/drain metal is deposited and etched to form a source electrode 65, a drain electrode 66 (which is the upper electrode of a parasitic capacitor), a data line 67, and an upper electrode 57 of the storage capacitor.

As shown in L2 and L3 of FIGS. 5 and 6, respectively, each of the storage and parasitic capacitors has electrodes 66 and 57 that overlap corresponding edges of the lower electrodes 60 and 53, respectively.

Figure 7E:
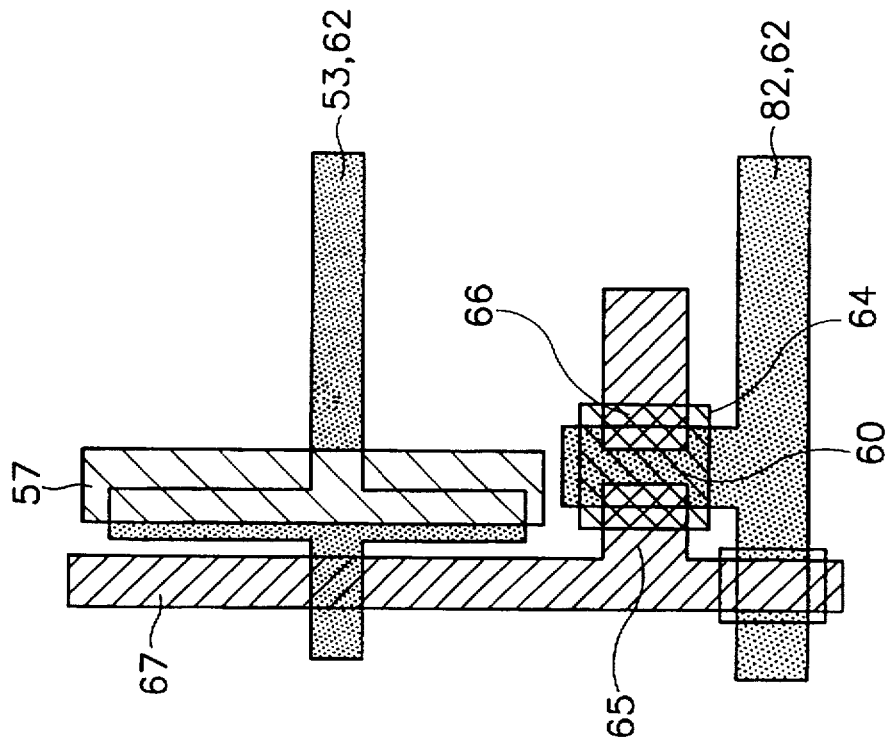

As shown in FIG. 4 and 7E, the $N^+$ amorphous silicon layer 68 exposed between the source electrode 65 and the drain electrode 66 as formed in FIG. 7D is etched by a dry-etching method.

Figure 7G:
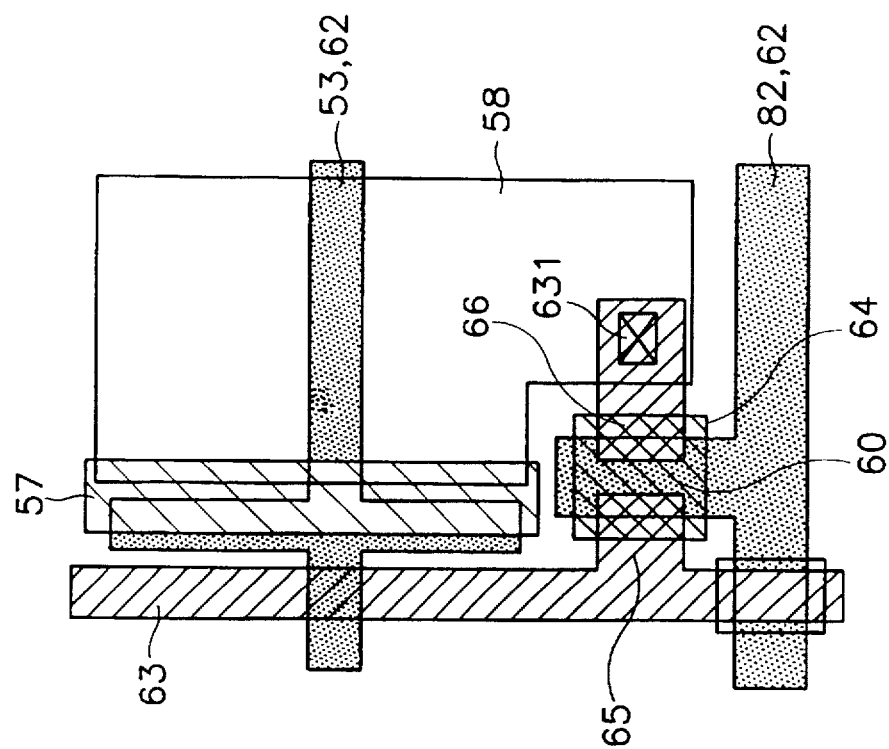
Figure 7F:
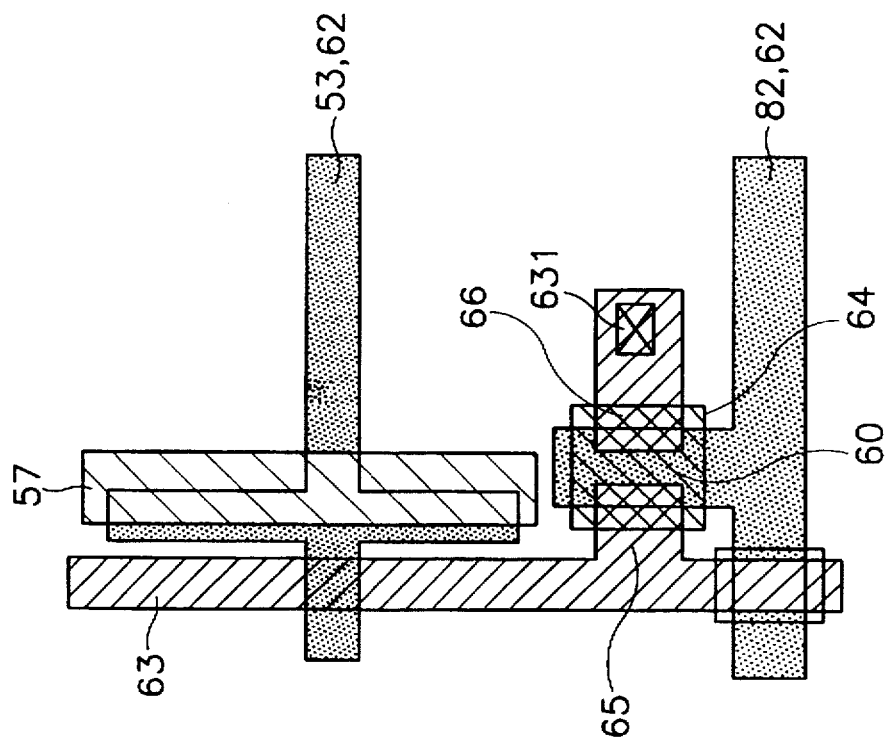

As shown in FIGS. 4, 6, and 7F, a passivation layer 63 is deposited and then etched so that a contact hole 631 is formed in the passivation layer 63. The passivation layer 63 is made of SiNx or an acrylic resin.

As shown in FIGS. 4 and 7G, a transparent conductive material such as ITO (indium tin oxide) is deposited on the passivation layer 63 and patterned to form a pixel electrode 58 which is subsequently electrically connected with the upper electrode 66 of the parasitic capacitor through a contact hole 631. As shown in FIG. 5, the upper electrode 57 overlaps with the lower electrode 53 of the storage capacitor. Accordingly, the overlapping portions of the upper electrode 57 and the lower electrode 53 operate as the storage capacitor rather than the pixel electrode 58 and the lower electrode 53. Because the overlap of the storage and parasitic capacitors both run in the same direction, differences between shot-blocks are compensated for and thus the dc-offset $\Delta Vp$ is always proportional.

As a result, a TFT-LCD according to the present invention achieves a desirable display uniformity by reducing the error ratio of a dc-offset voltage $\Delta Vp$ to less than 1%.

Figure 1:
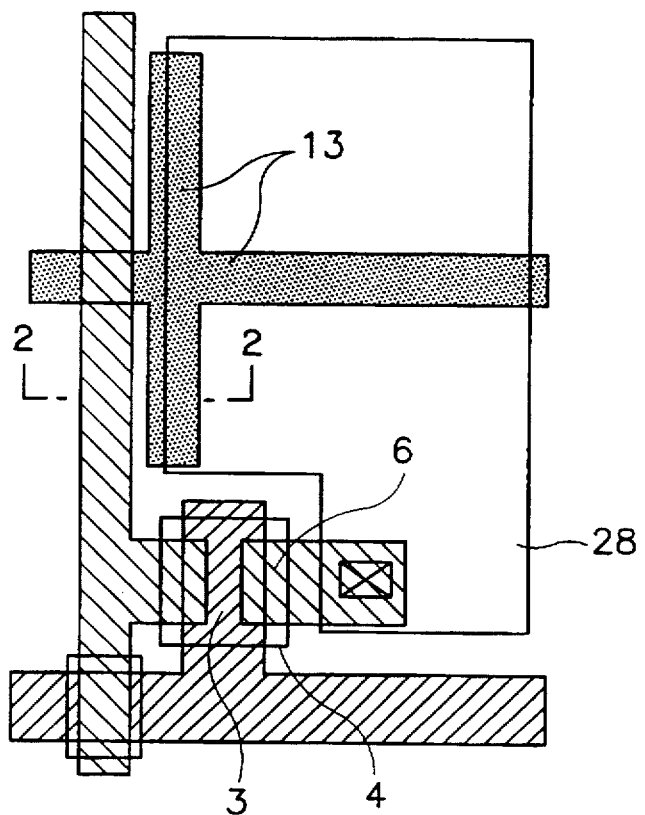
FIG. 1 is a plan view illustrating a pixel of a conventional TFT-LCD.
Figure 2:
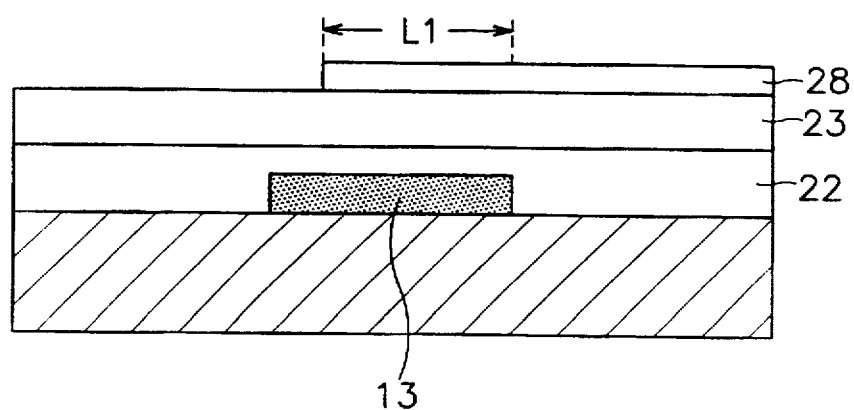
FIG. 2 is a cross-sectional view, taken along line 2—2 of FIG. 1, illustrating a storage capacitor of the conventional TFT-LCD.
Figure 3:
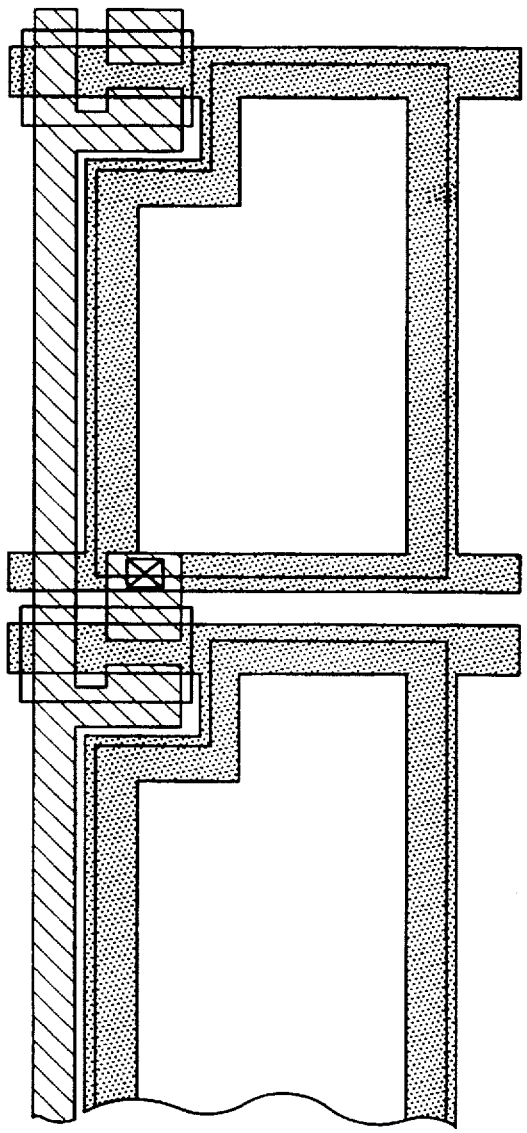
FIG. 3 is a plan view illustrating a pixel of another conventional TFT-LCD.
Figure 8:
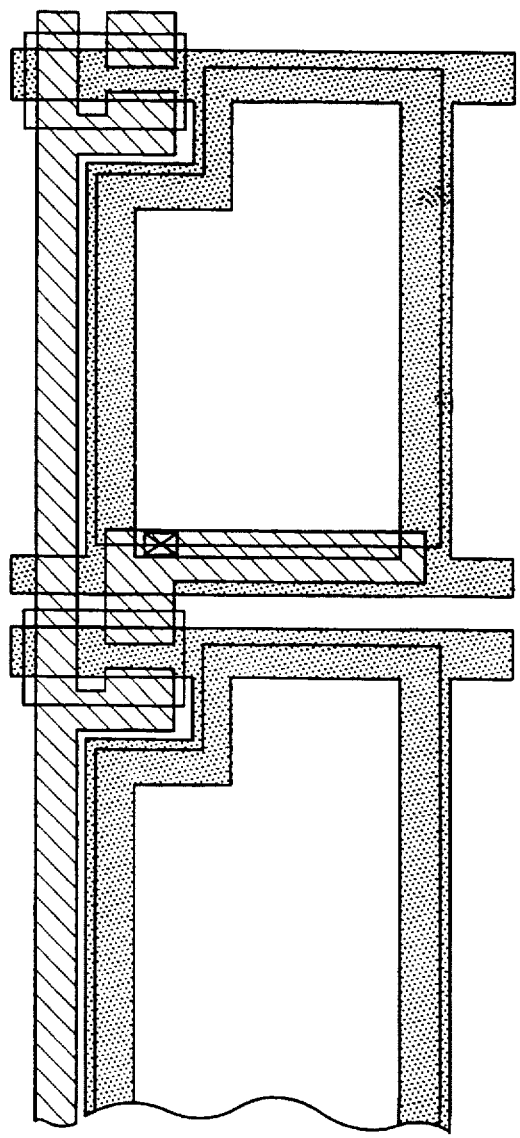
FIG. 8 is a plan view illustrating a pixel of a TFT-LCD in accordance with another preferred embodiment of the present invention.

FIG. 8 is a plan view illustrating a pixel of a TFT-LCD in accordance with another preferred embodiment of the present invention, in which the layout for both a storage capacitor and a parasitic capacitor is different from that of FIG. 4.

It is understood that various other modifications will be apparent to and can be readily made by those skilled in the art without departing from the scope and spirit of this invention. Accordingly, it is not intend that the scope of the claims appended hereto be limited to the description set forth above, but rather that the claims be construed as encompassing all the features of patentable novelty that reside in the present invention, including all features that would be treated as equivalents thereof by those skilled in the art to which this invention pertains.

What is claimed is:

1. A structure of a parasitic capacitor and a storage capacitor in a thin film transistor-liquid crystal display, comprising:

a first lower electrode forming a portion of said parasitic capacitor;

a second lower electrode forming a portion of said storage capacitor;

a first insulating layer disposed over said first and second lower electrodes;

a first upper electrode forming an additional portion of said parasitic capacitor and being disposed on said first insulating layer so as to overlap an edge of said first lower electrode;

a second upper electrode forming an additional portion of said storage capacitor and being disposed on said first insulating layer so as to overlap an edge of said second lower electrode in a direction corresponding to that in which said first upper electrode overlaps the edge of said first lower electrode; and a second insulating layer disposed over said first and second upper electrodes; and a pixel electrode disposed on said second insulating layer and electrically connected to said first upper electrode.

2. The structure according to claim 1 wherein said pixel electrode partially overlaps said first upper electrode so that said pixel electrode can be electrically connected to said first upper electrode through a contact hole in said second insulating layer.

3. The structure according to claim 1, wherein said second lower electrode is connected with an adjacent gate line.

4. The structure according to claim 1, wherein said second lower electrode is separated from a gate line.

5. A portion of a liquid crystal device structure comprising:

a substrate;

a gate electrode disposed on said substrate, said gate electrode also being a lower parasitic capacitor electrode;

a lower storage electrode of a storage capacitor;

a first insulating layer which covers said gate electrode and said lower electrode;

a source and drain spaced from each other and formed on said first insulating layer so that said gate electrode is disposed below and between said source and drain so that said source and drain overlap edges of said gate electrode in a direction, said drain also being an upper parasitic capacitor electrode;

an amorphous silicon layer disposed above said first insulating layer and below said source and drain, said amorphous silicon layer used to establish a current path between said source and drain;

an upper storage electrode formed on said first insulating layer and disposed over said lower storage electrode, said upper storage electrode overlapping an edge of said lower storage electrode in said direction;

a second insulating layer disposed over said drain and said upper storage electrode; and a pixel electrode disposed on said second insulating layer and electrically connected to said upper parasitic electrode.

6. The structure according to claim 5 wherein said pixel electrode partially overlaps said drain so that said pixel electrode can be electrically connected to said drain through a contact hole in said second insulating layer.

7. The structure according to claim 5, wherein said lower storage electrode is connected with an adjacent gate line.

8. The structure according to claim 5, wherein said lower storage electrode is separated from a gate line.

9. The structure according to claim 5 further including first and second $N^+$ amorphous silicon layers disposed below said source and drain, respectively, so that said first and second $N^+$ amorphous silicon layers electrically connect said source and drain, respectively, to said amorphous silicon layer.

10. The structure according to claim 5, wherein said upper storage electrode is separated from said drain.

11. A method for making a portion of a thin film transistor-liquid crystal display, comprising the steps of:

forming a gate electrode and a lower storage electrode of a storage capacitor on a substrate;

forming a gate insulating layer over said gate electrode and said lower storage electrode;

forming a semiconductor layer over a portion of said gate insulating layer;

forming simultaneously a source electrode, a drain electrode which overlaps an edge of said gate electrode in a direction, and an upper storage electrode which overlaps an edge of said lower storage electrode in said same direction;

forming a second insulating layer disposed over said drain and said upper storage electrode; and forming a pixel electrode on said second insulating layer that is electrically connected to said drain electrode.

* * * * *